(12) United States Patent
Sarakas

(10) Patent No.: US 6,961,413 B2
(45) Date of Patent: Nov. 1, 2005

(54) RESIDENTIAL TELEPHONE SYSTEM AND METHOD

(76) Inventor: Stephen T. Sarakas, 345 Misty Valley Dr., St. Peters, MO (US) 63376

( * ) Notice: Subject to any disclaimer, the term of this patent is extended or adjusted under 35 U.S.C. 154(b) by 21 days.

(21) Appl. No.: 10/641,131

(22) Filed: Aug. 14, 2003

(65) Prior Publication Data

US 2004/0165706 A1 Aug. 26, 2004

Related U.S. Application Data

(60) Provisional application No. 60/448,351, filed on Feb. 19, 2003.

(51) Int. Cl.[7] .............................................. H04M 3/42
(52) U.S. Cl. ............................................... 379/201.01
(58) Field of Search ............................. 399/88.19, 88.2, 399/88.27, 207.11, 207.13, 207.15

(56) References Cited

U.S. PATENT DOCUMENTS

| | | |
|---|---|---|
| 4,266,098 A | 5/1981 | Novak |
| 4,446,334 A | 5/1984 | Groff |
| 4,625,079 A | 11/1986 | Castro et al. |
| 4,674,115 A | 6/1987 | Kaleita et al. |
| 4,817,133 A | 3/1989 | Takahashi et al. |
| 4,845,743 A | 7/1989 | Lutz |
| 4,850,013 A | 7/1989 | Rose |
| 4,860,347 A | 8/1989 | Costello |
| 4,893,335 A | 1/1990 | Fuller et al. |
| 4,924,496 A | 5/1990 | Figa et al. |
| 4,937,854 A | 6/1990 | Sarakas |
| 5,029,196 A | 7/1991 | Morganstein |
| 5,048,076 A | 9/1991 | Maurer et al. |
| 5,056,132 A | 10/1991 | Coleman et al. |
| 5,062,133 A | 10/1991 | Melrose |
| 5,109,405 A | 4/1992 | Morganstein |
| 5,157,712 A | 10/1992 | Wallen, Jr. |
| 5,220,599 A | 6/1993 | Sasano et al. |
| 5,228,077 A | 7/1993 | Darbee |
| 5,228,080 A | 7/1993 | Nutter et al. |
| 5,276,731 A | 1/1994 | Arbel et al. |
| 5,347,574 A | 9/1994 | Morganstein |
| 5,351,289 A | 9/1994 | Logsdon et al. |
| 5,361,295 A | 11/1994 | Solomon et al. |
| 5,388,150 A | 2/1995 | Schneyer et al. |
| 5,394,445 A | 2/1995 | Ball et al. |
| 5,414,756 A | 5/1995 | Levine |
| 5,452,346 A | 9/1995 | Miyamoto |
| 5,467,385 A | 11/1995 | Reuben et al. |
| 5,467,388 A | 11/1995 | Redd, Jr. et al. |
| 5,490,205 A | 2/1996 | Kondo et al. |
| 5,497,413 A | 3/1996 | Nakano |

(Continued)

Primary Examiner—Creighton Smith
(74) Attorney, Agent, or Firm—Senniger Powers

(57) ABSTRACT

The invention relates to a telephone system and method for use by a residential user. A residential telephone system is electrically coupled to an external telephone service facility and electrically coupled to a user telephone. The system comprises a telephone service facility interface for receiving an incoming call signal from the external telephone service facility and a user telephone interface for transmitting the incoming call signal to the user telephone and for receiving an administrative signal from the user telephone. The system also comprises a memory and a messaging module for storing in the memory a calling party message received from a calling party in the incoming call signal. The system further comprises a connection module responsive to the administrative signal received from the user telephone via the user telephone interface for receiving an incoming call signal and processing the incoming call signal to either connect the incoming call signal to the messaging module or to transmit the incoming call signal to the user telephone via the user telephone interface. The invention also relates to a system for remotely administering a residential telephone system. The invention further relates a system and method for call management of incoming calls by a residential telephone system.

24 Claims, 5 Drawing Sheets

U.S. PATENT DOCUMENTS

| | | | |
|---|---|---|---|
| 5,497,414 A | 3/1996 | Bartholomew | |
| 5,528,669 A | 6/1996 | Chee | |
| 5,528,680 A | 6/1996 | Karpicke | |
| 5,546,448 A | 8/1996 | Caswell et al. | |
| 5,550,900 A | 8/1996 | Ensor et al. | |
| 5,553,123 A | 9/1996 | Chan et al. | |
| 5,563,935 A | 10/1996 | Small | |
| 5,572,572 A | 11/1996 | Kawan et al. | |
| 5,600,711 A | 2/1997 | Yuen | |
| 5,602,908 A | 2/1997 | Fan | |
| 5,604,791 A | 2/1997 | Lee | |
| 5,604,797 A | 2/1997 | Adcock | |
| 5,610,970 A * | 3/1997 | Fuller et al. | 455/417 |
| 5,623,537 A | 4/1997 | Ensor et al. | |
| 5,631,951 A | 5/1997 | Chen | |
| 5,633,920 A | 5/1997 | Kikinis et al. | |
| 5,644,629 A | 7/1997 | Chow | |
| 5,651,053 A | 7/1997 | Mitchell | |
| 5,657,378 A | 8/1997 | Haddock et al. | |
| 5,659,602 A | 8/1997 | Gay | |
| 5,673,299 A * | 9/1997 | Fuller et al. | 379/210.03 |
| 5,724,408 A | 3/1998 | Morganstein | |
| 5,727,045 A | 3/1998 | Kim | |
| 5,748,709 A | 5/1998 | Sheerin | |
| 5,751,760 A | 5/1998 | Fuller et al. | |
| 5,768,356 A | 6/1998 | McKendry et al. | |
| 5,781,613 A | 7/1998 | Knuth et al. | |
| 5,812,648 A | 9/1998 | Wanner | |
| 5,822,416 A | 10/1998 | Goodacre et al. | |
| 5,835,727 A | 11/1998 | Wong et al. | |
| 5,841,838 A | 11/1998 | Itoh et al. | |
| 5,875,241 A | 2/1999 | Chang et al. | |
| 5,881,134 A | 3/1999 | Foster et al. | |
| 5,887,139 A | 3/1999 | Madison, Jr. et al. | |
| 5,898,769 A | 4/1999 | Furman | |
| 5,901,209 A | 5/1999 | Tannenbaum et al. | |
| 5,922,047 A | 7/1999 | Newlin et al. | |
| 5,923,739 A | 7/1999 | Disalvo | |
| 5,930,700 A | 7/1999 | Pepper et al. | |
| 5,946,381 A | 8/1999 | Danne et al. | |
| 5,991,367 A | 11/1999 | Robuck | |
| 5,995,603 A | 11/1999 | Anderson | |
| 6,012,088 A | 1/2000 | Li et al. | |
| 6,031,904 A | 2/2000 | An et al. | |
| 6,044,148 A | 3/2000 | Bleile | |
| 6,052,442 A | 4/2000 | Cooper et al. | |
| 6,061,686 A | 5/2000 | Gauvin et al. | |
| 6,091,808 A | 7/2000 | Wood et al. | |
| 6,104,791 A | 8/2000 | Gizara et al. | |
| 6,128,382 A | 10/2000 | Borland et al. | |
| 6,134,320 A | 10/2000 | Swan et al. | |
| 6,137,871 A | 10/2000 | Maier et al. | |
| 6,160,877 A | 12/2000 | Tatchell et al. | |
| 6,181,781 B1 | 1/2001 | Porter et al. | |
| 6,185,283 B1 | 2/2001 | Fuller et al. | |
| 6,198,812 B1 | 3/2001 | Weber | |
| 6,212,261 B1 | 4/2001 | Meubus et al. | |
| 6,229,878 B1 | 5/2001 | Moganti | |
| 6,233,323 B1 | 5/2001 | Ali et al. | |
| 6,233,330 B1 | 5/2001 | McClure et al. | |
| 6,236,717 B1 | 5/2001 | Bremer et al. | |
| 6,243,461 B1 | 6/2001 | Hwang | |
| 6,249,575 B1 | 6/2001 | Heilmann et al. | |
| 6,252,944 B1 | 6/2001 | Hansen, II et al. | |
| 6,253,075 B1 | 6/2001 | Beghtol et al. | |
| 6,256,319 B1 | 7/2001 | Apgar et al. | |
| 6,256,389 B1 | 7/2001 | Dalrymple et al. | |
| 6,259,449 B1 | 7/2001 | Saxena et al. | |
| 6,259,779 B1 | 7/2001 | Council et al. | |
| 6,266,400 B1 | 7/2001 | Castagna | |
| 6,282,275 B1 | 8/2001 | Gurbani et al. | |
| 6,285,364 B1 | 9/2001 | Giordano, III et al. | |
| 6,289,084 B1 | 9/2001 | Bushnell | |
| 6,298,122 B1 | 10/2001 | Horne | |
| 6,324,263 B1 | 11/2001 | Sherwood et al. | |
| 6,327,347 B1 | 12/2001 | Gutzmann | |
| 6,330,314 B1 | 12/2001 | Motooka | |
| 6,332,085 B1 | 12/2001 | Hanson et al. | |
| 6,333,973 B1 | 12/2001 | Smith et al. | |
| 6,353,660 B1 | 3/2002 | Burger et al. | |
| 6,353,663 B1 | 3/2002 | Stevens et al. | |
| 6,359,970 B1 | 3/2002 | Burgess | |
| 6,370,141 B1 | 4/2002 | Giordano, III et al. | |
| 6,400,814 B1 | 6/2002 | Adams | |
| 6,418,211 B1 | 7/2002 | Irvin | |
| 6,442,249 B1 | 8/2002 | Miller, Jr. | |
| 6,445,694 B1 | 9/2002 | Swartz | |
| 6,456,706 B1 | 9/2002 | Blood et al. | |
| 6,456,715 B1 | 9/2002 | Kennedy | |
| 6,457,038 B1 | 9/2002 | Defosse | |
| 6,473,788 B1 | 10/2002 | Kim et al. | |
| 6,480,586 B1 | 11/2002 | Hayes et al. | |
| 6,480,890 B1 | 11/2002 | Lee, Jr. et al. | |
| 6,483,898 B2 | 11/2002 | Lew et al. | |
| 6,483,906 B1 | 11/2002 | Iggulden et al. | |
| 6,493,432 B1 | 12/2002 | Blum et al. | |
| 6,496,692 B1 | 12/2002 | Shanahan | |
| 6,501,837 B1 | 12/2002 | Adler et al. | |
| 6,510,209 B1 | 1/2003 | Cannon et al. | |
| 6,775,273 B1 * | 8/2004 | Kung et al. | 370/356 |

* cited by examiner

RESIDENTIAL TELEPHONE SYSTEM AND METHOD

CROSS REFERENCE TO RELATED APPLICATIONS

The invention of the present patent application is a non-provisional patent application that claims priority based on U.S. Provisional Application Ser. No. 60/448,351, filed on Feb. 19, 2003, the entire disclosures of which are incorporated herein by reference.

FIELD OF THE INVENTION

The invention relates generally to a residential telephone system and methods of operation. In particular, the invention relates to a residential telephone system that screens incoming telephone calls based on user-defined call-processing parameters and characteristics. The invention also relates to a system for remotely administering and configuring a residential telephone system. The invention further relates to a system and method for call management of incoming calls by a residential telephone system.

BACKGROUND OF THE INVENTION

Telephone systems and services provide users with many benefits but also provide users with problems such as unwanted interruptions from calls. Unwanted telephone calls consist of intrusive sales calls, fraudulent promotions and other solicitations, and malicious calls intended to harass or intimidate.

Systems and methods have been disclosed in the prior art for reducing or eliminating unwanted telephone calls that have received varying degrees of success and user satisfaction. These systems and methods may be categorized into deterministic and nondeterministic solutions. Nondeterministic solutions are those, which do not have an immediate and verifiable result. One example of a nondeterministic solution is to answer the telephone call, then upon discovering the same call is from an unwanted source, simply ask the calling party not to call back again and abruptly end the call. Nondeterministic solutions require one's engagement and seldom have any lasting effect. Another common nondeterministic solution is to place a telephone number on a list from which solicitors are forbidden to place calls.

Deterministic solutions for eliminating unwanted phone calls may be divided into two groups. These are special added services that are offered to a user by the telephone service provider, and electronic devices for processing incoming telephone calls in the users' own residence. Deterministic solutions provide the means for preventing the completion of an unwanted phone call. Hence, an interruption does not take place and the user is not notified of the attempted incoming phone call. Special added services offered by the telephone service provider are not universally available and become costly when the same monthly charge is incurred over a period of time. For purposes of reducing unwanted telephone calls, several special added services are often necessary for use in conjunction with each other. Electronic devices located at the residence vary widely in their means and effectiveness. Some are quite unique, but not all electronic devices are completely deterministic. Several electronic devices require the engagement of the user, while others necessarily inconvenience every calling party so that unwanted calls are more or less restricted by its operation.

Probably the most common single hardware device employed for mitigating unwanted phone calls in a user's residence is the ubiquitous answering machine. An answering machine greets each calling party with a message prepared beforehand by the user, then offers the calling party an opportunity to record a message intended for the user. When used to intercept telephone calls, a user compels every calling party to listen to the recorded greeting. By doing so, callers are detained unnecessarily and become annoyed when the user cannot be immediately reached. The user is consequently engaged in the screening process when listening to the calling party begin to leave a message, and then choosing whether or not to pick up the telephone receiver and complete the call personally. The inconvenience to callers becomes worse if the user chooses only to later return calls, after reviewing complete messages left by callers.

Caller ID is a special added service offered to users by a telephone service provider, and made possible by the use of an electronic device connected to the user's telephone line. Such an electronic device includes a display that the user can glance at upon hearing the phone ring. The display receives the calling party data between the first and second ringing cycles and provides a display of the calling party data to identify the party attempting to call the user. The action of responding to a ringing phone, only to peer at a Caller ID display to learn that the calling party is unwanted is often inconvenient. Caller ID has been described as the key element in the operation of numerous patented inventions seeking to improve upon the basic system and operation. Most such inventions are designed to determine automatically if an incoming telephone call is from a desirable and friendly caller, before the telephone rings for the first time. After a determination is made, the phone call is either allowed to continue to the user's phones or is blocked altogether. This is certainly a deterministic solution, but one which fails in practice. While display indicating UNAVAILABLE or OUT OF AREA are often considered to be a soliciting entity or person, this is not necessarily the case. It is possible for a desirable and friendly calling party to produce such a result, defectively so. In such a case, the user will not know that the calling party was actually desirable and friendly. It is also possible for a determined calling party to deceive Caller ID system based on the a manipulation of the Caller ID system. Also, where Caller ID is not available or is not subscribed by the user, an equally deterministic solution is not available.

Additionally, electronic devices located in the residence may intercept incoming phone calls and require a calling party to enter a numerical passcode. Upon entering a passcode that matches a user-selected passcode, either a separate annunciation is made or the telephone is made to ring normally. If the correct passcode is not received, the calling party is disconnected or sent to an attached answering machine. This is a very deterministic solution, but requires the user to distribute the passcode to every possible desirable and friendly caller. This is both undesirable and administratively burdensome.

The advantages to such a passcode system are many and worth preserving, if an improvement eliminates the inconvenience to friendly and desirable callers. Some of the advantages of the passcode solution include the definite elimination of unwanted phone calls without added monthly expenses incurred by special added services, the certainty of preventing deception by sophisticated apparatus, the elimination of user engagement and consequential distraction of momentarily processing individual telephone calls by visual or audible means, the enjoyable option of altering an older passcode in favor of a newly chosen one to increase the user's security, and the elimination of any inconvenience to a calling party compelling them to listen to a lengthy greeting intended only for message recording.

Numerous call screening devices necessarily inconvenience callers and cannot produce both an efficient and unencumbered experience for the calling party while affording the user a maximum of privacy. U.S. Pat. No. 5,751,760 to Fuller discloses playing sounds intended to deceive unwitting callers. U.S. Pat. No. 6,198,812 to Weber discloses requiring callers to phone a first time, hang up, then call back. Issuing a randomly generated passcode for each call is the method disclosed by U.S. Pat. No. 5,991,367 to Robuck. This scheme requires the calling party to listen to a greeting in its entirety before entering the passcode, which is announced to the calling party in the greeting. U.S. Pat. No. 5,604,797 to Adcock and U.S. Pat. No. 5,812,648 to Wanner disclose a timer to confound callers by permitting a call to immediately pass to the user's phone only at certain predetermined times. Prioritizing different types of calls according to a schedule is the object of U.S. Pat. No. 6,359,970 to Burgess.

Some call screening devices do not use a ring generator, but only provide local annunciation of the incoming call attempt. U.S. Pat. No. 4,845,743 to Lutz and U.S. Pat. No. 4,850,013 to Rose represent devices intended for use with a single phone in close proximity to the user. A ring generator is necessary to activate a separate answering machine, and call screening devices that include a ring generator are disclosed by U.S. Pat. No. 4,893,335 to Fuller and U.S. Pat. No. 6,456,706 to Blood. Other call screening devices utilize a ring generator to ring telephones and an answering machine such as U.S. Pat. No. 4,266,098 to Novak, U.S. Pat. No. 4,937,854 to Sarakas, and U.S. Pat. No. 5,563,935 to Small. These disclose a separate answering machine for recording messages and for providing a path for callers who do not have the passcode. U.S. Pat. No. 6,233,330 to McClure discloses a call-screening device with a ring generator to activate a separate answering machine and to ring individual telephones. In McClure callers are distinguished by the code entered and routed accordingly. McClure is an example of a basic downstream switcher. Other known systems include an adjunct unit that is attached to every phone in a user's residence. Each adjunct unit is designed to ring the single telephone to which it is connected. A single unit combination of a telephone and an answering machine that includes one method of call screening is disclosed by U.S. Pat. No. 5,490,205 to Kondo and U.S. Pat. No. 5,995,603 to Anderson. However, these disclosed systems require that a user be physically at the unit and commonly include some combination of keypad and display. Other known systems provide a telephone and answering machine combination that feature limited call screening features. However, the user is required to physically attend to each unit to change any of the settings, with each unit being limited to controlling a single user phone.

Caller ID has frequently been described as a means for screening callers. A device that blocks calls due to the absence of Caller ID information is disclosed by U.S. Pat. No. 5,228,080 to Nutter.

U.S. Pat. No. 5,351,289 to Logsdon is an example of other devices that block incoming calls until Caller ID information is obtained and the calling party is identified from a list. Blocking a call without seizing the line is commonly referred to as ring suppression. Following the Caller ID screening process, subsequent ringing is simply passed to the user's phones. In the system disclosed in Logsdon, delays can be annoying, since there is not a ring generator to immediately ring the telephones. This type of system is further disclosed by U.S. Pat. No. 6,400,814 to Adams and U.S. Pat. No. 6,442,249 to Miller.

The use of a passcode is treated as an afterthought when the calling party is required to enter it only in the case of corrupted Caller ID data as disclosed by U.S. Pat. No. 5,388,150 to Schneyer and U.S. Pat. No. 6,298,122 to Home. A central office implementation is disclosed by U.S. Pat. No. 5,651,053 to Mitchell. A similar feature is offered by public switched telephone network service providers under various names that are generally referred to as call rejection services.

The use of Caller ID and a list to match individual callers with individual users is disclosed by U.S. Pat. No. 5,220,599 to Sasano, U.S. Pat. No. 5,394,445 to Ball, and U.S. Pat. No. 6,324,263 to Sherwood. Other systems require a list of allowed callers to be screened, or of callers to be blocked, before Caller ID information can be used to screen calls. U.S. Pat. No. 5,029,196 to Morganstein, U.S. Pat. No. 5,109,405 to Morganstein, and U.S. Pat. No. 5,276,731 to Arbel are examples. Devices have also been disclosed that use Caller ID information to additionally route callers, after first determining the nature of a call, such as disclosed by U.S. Pat. No. 5,644,629 to Chow and U.S. Pat. No. 5,724,408 to Morganstein. Because these systems perform routing, they also require a separate path to be wired to each telephone. None of these retransmit Caller ID information to all the user's phones and any adjunct Caller ID displays, however, see U.S. Patent Publication 20020018546 to Horne in which Caller ID is retransmitted when the ringing is passed. Retransmitting Caller ID requires retransmitting ringing signals since Caller ID requires interaction with the ringing signal.

Several central phone system designs have been proposed. Many require the use of special telephones or a network of special transceivers each connected to a phone, such a network as disclosed in U.S. Pat. No. 5,550,900 to Ensor and U.S. Pat. No. 5,623,537 to Ensor. U.S. Pat. No. 6,229,878 to Moganti discloses a computer and hard drive that performs as an answering machine and utilizes Caller ID information to handle calls in various ways. U.S. Pat. No. 6,456,715 to Kennedy also depends on a computer for use with a telephone. Commands are received through an interface port and result in a change of the connection status of the telephone.

Still others are intended for connection to and an active presence on a computer network such as U.S. Pat. No. 5,633,920 to Kikinis, U.S. Pat. No. 6,091,808 to Wood, U.S. Pat. No. 6,259,449 to Saxena, and U.S. Pat. No. 6,473,788 to Kim. Examples of those requiring the cooperation of a central office are disclosed by U.S. Pat. No. 5,467,388 to Redd, Jr., U.S. Pat. No. 5,497,414 to Bartholomew, U.S. Pat. No. 6,031,904 to An, U.S. Pat. No. 6,044,148 to Bleile, U.S. Pat. No. 6,134,320 to Swan, U.S. Pat. No. 6,259,779 to Council, U.S. Pat. No. 6,353,663 to Stevens, and U.S. Pat. No. 6,483,898 to Lew.

U.S. Pat. No. 6,252,944 to Hansen, II offers a small business solution by providing communications between a voice mail system and a telephone system or PBX, but does not provide for screening callers beyond listening to the calling party and deciding whether to accept the call or not, nor does this system provide essential central office capability. Instead, similar to U.S. Pat. No. 5,768,356 to McKendry, low level voice and command signals are conducted by a digital switching matrix. Many small business telephone systems are basically downstream switchers and U.S. Pat. No. 5,604,791 to Lee is another example of switching low level signals.

Although U.S. Pat. No. 5,881,134 to Foster has been proposed as a call processing platform suitable for homes, Foster does not disclose a galvanic default path. Because of an emphasis on one application of voice recognition to the command and control of the described call processing platform, the audio path is intentionally comprised of active circuits alone. Unfortunately, in the event of power failure where emergency or battery backup is not provided, the connected telephones become inoperable. This is a well-known drawback of smaller commercial PBX systems also, to which the same disclosure can be compared. As is apparent from the detailed drawings and description of Foster, telephone conversations conducted between a calling party and the user across the described call processing platform would not take place along a metallic path. Communications conducted in such a way can be expected to suffer losses and delays associated with the series arrangement of two codecs (e.g., coder/decoders). That this is the intended arrangement can be verified by noting that upon placing an outgoing call, digits entered by the user are first captured, then reissued by the external communications circuit. Furthermore, the dial tone presented to a user upon lifting the telephone receiver to place a call is either locally generated, or is converted from the telephone line. Additional limitations result from an external interface and a local interface that are not simultaneously and independently controlled. This limitation is apparent from both the system diagram and the flow diagrams. In Foster, the delay imposed by such a call processing platform is clear. In one case, the user cannot place an outgoing call until and unless the processing of a coincident incoming call has been completed. In another case, only one access to the message memory can take place at a time. Once a remote access by a calling party begins, the user is unable to use a telephone. Additional limitations are manifested in the inconvenience imposed on both the calling party and the user. The user is forced to respond to every call immediately, individually issuing a command trigger to dispose of the call in one way or another during ringing. If incoming Caller ID is detected, it is used only to block certain calls, or to allow certain calls from a list to pass. Caller ID may also be announced to the user when the incoming call is responded to by the user. But, Caller ID is not retransmitted, nor combined with the use of a passcode to provide the desired screening functionality. The local interface referred to as a Telephone Line Interface Circuit is particularly limiting as described by the same disclosure. If calls can be routed to one phone, but not another, a separate path would have to be provided for each. If only one Telephone Line Interface Circuit is used as is shown in Foster, then when one telephone is in use, none of the other telephones would be operable. This is due to the disclosed switching arrangement of Foster.

Some small business telephone systems use proprietary digital phones or standard analog phones to accomplish similar features for the small business telephone system. Such systems may incorporate voice mail and phone switching into a single unit, but only provide simple call screening capabilities such as a Do Not Disturb feature that sends callers automatically into a voice mailbox. The same telephone system also requires one to attach a computer to configure the system. The same telephone system does not retransmit incoming Caller ID information to any of the telephones in the system.

A direct connection to a device from a remote location for transferring files can be made in several different ways. Using DTMF alone to transfer data slowly by phone is disclosed in U.S. Pat. No. 5,923,739 to DiSalvo and U.S. Pat. No. 6,233,323 to Ali. A universal infrared remote control that can be upgraded by downloading new code data directly through a receiving port from the telephone line is disclosed by U.S. Pat. No. 5,228,077 to Darbee. However, the source of new code data is not disclosed. U.S. Pat. No. 6,496,692 to Shanahan describes a method by which audio files first selected by a user, are then downloaded to a device, such as a portable device. Several different devices that use audio files are mentioned by the disclosure, but a wireless telephone is the principal target. Following installation of the audio file, it can serve to announce incoming calls. Because a direct access arrangement is not expected to be part of many devices, to program these with downloaded audio files a separate programmer module is added to the scheme.

Using a modem to make a direct connection with a device to perform data transfer is common and well known. For use in programming a video recorder, the apparatus and method disclosed by U.S. Pat. No. 5,414,756 to Levine includes a modem that is attached to a phone jack, and a telephone that shares the same connection. If a video recorder or other device is connected to the modem, the telephone can be used to summon a remote computer. In turn, the remote computer responds to signals issued by the telephone and transmits initialization signals to the video recorder, through the modem. Programming a video recorder by using a telephone is also the object of U.S. Pat. No. 6,510,209 to Cannon. Cannon discloses a telephone answering device having a call signal decoder and output adapter that is implemented as a remote programmer. A user placing a telephone call to the device can program the video recorder using the telephone. A cordless telephone can also be used to program the video recorder, if adapted to include a call signal decoder.

A well-known procedure for remotely accessing secure mainframe computers is one in which a call is first placed to a server requesting access. Caller ID associated with the calling party is used to return the call. After the calling party responds to the server callback, access is permitted since the calling party has been proven. If Caller ID service is not available, then the calling party can enter the telephone number manually. U.S. Pat. No. 6,480,586 to Hayes describes a system for establishing remote control of an appliance by telephone, using a similar method. In such a system, an Appliance Gateway is configured to control appliances and recognizes Caller ID associated with an incoming call from an Appliance Server. The Appliance Gateway then returns a telephone call to the familiar Calling Station, thereby establishing a communication session. An advantage of using Caller ID is that data can be conveyed by the Calling Station to the appliance without incurring a charge for making the telephone call. Caller ID is also described by the same disclosure as a means for directly conveying commands, a scheme that is compared to various dated methods of signaling an appliance using patterns of ringing. Where Caller ID is not available, FAX tones are transmitted instead. Means are added to the Appliance Server and the Appliance Gateway to distinguish between apparatus that can use Caller ID, and apparatus that cannot. The preferred embodiment includes a display, but where such terminal like devices are implemented, the user is required to go to the unit. An Appliance Server as disclosed in the disclosure cannot "transmit" Caller ID across a Public Switched Telephone Network, and references to the on-hook receipt of calling party identification at the Appliance Gateway applies to a locally generated signal. A "first data modem for sending Caller ID signals" is a similar reference. Examples of such applications are in a factory, or large office complex.

Several disclosures introduce a special intermediate programming module or transfer device to convey downloaded settings to a household appliance. One example is U.S. Pat. No. 5,600,711 to Yuen that discloses a remote controller to transfer initializing settings such as a clock setting to an appliance. The remote controller necessarily includes another clock that is made to agree with the clock settings conveyed by the remote computer, thereby permitting some delay in the manual transfer of settings to the appliance from the remote controller. The same disclosure does not suggest a relationship between the remote site and the Internet. Background information pertaining to the particular appliance must be sent to the remote site using the involved telephone, in the form of a series of commands. The consequential response of the remote site and downloading of settings can only take place using the same telephone connection. An alternate embodiment is disclosed where a microphone operates as the remote controller. In U.S. Pat. No. 5,553,123 to Chan various methods of error checking and a plurality of tests are disclosed to overcome transmission losses associated with the use of a microphone as a remote controller.

In the same way that a flurry of innovations describing various applications of Caller ID to call screening began to appear with the introduction of Caller ID services by the public switched telephone companies, an abundance of Internet related innovations has appeared with the wide spread use of the Internet. U.S. Pat. No. 6,031,904 to An and U.S. Pat. No. 6,445,694 to Swartz disclose means for employing an Internet webpage to establish central office control of a subscriber's phone service. A device that accesses the Internet directly is referred to as an Internet appliance. Such a device typically places an outgoing call, the call being made automatically or under the direction of a user. Once a connection is made to a certain IP address, the device transfers selected files. A method and apparatus representing an Internet appliance is disclosed by U.S. Pat. No. 6,012,088 to Li and U.S. Pat. No. 6,370,141 to Giordano, III. U.S. Pat. No. 6,457,038 to DeFosse discloses a local area network comprised of a host and numerous application controllers, each application controller being associated with a vending machine. Data pertaining to the disposition of each vending machine is received by the host from all the application controllers, then exchanged with a further wide area network. The data is finally placed into a database accessible across the Internet. An answering machine periodically connects to the Internet to check for emails and downloads new emails for the user is disclosed by U.S. Pat. No. 6,052,442 to Cooper.

U.S. Pat. No. 6,483,906 to Iggulden discloses accessing an Internet website to establish various settings and preferences there, followed by the downloading of the settings to the same computer used to access the Internet website. The settings are then conveyed to the appliance by a portable transfer device. The same disclosure includes one embodiment in which the settings are downloaded directly to the appliance by a direct connection with the computer used to access the Internet website. Also suggested is another embodiment in which settings are downloaded directly to the portable transfer device from a remote computer associated with the Internet website. In such a system, subsequent user notification or access security is not disclosed. Each appliance setting operation is conducted substantially in a manual fashion. Every step requires the intimate interaction of the user. When the settings are downloaded directly to the appliance from a remote computer associated with the Internet website, this must be done by manually and temporarily making a telephone connection with the appliance. Some measure of security is inherent in the connecting and disconnecting of an appliance from the telephone connection.

Therefore, there is a need for a residential telephone system that provides user programmable screening and security features for enhancing call management of incoming telephone calls while at the same time minimizing inconvenience to friendly and desirable callers. There is also a need for a residential telephone system and method as disclosed herein that provides call management features that were not previously capable by prior art systems. Additionally, there is a need for a residential telephone system that may be configured by a remote server to provide operating software, features and configuration management. The residential telephone system as described herein provides novel configuration management of a residential telephone system thereby providing the user with improved call management features and configuration control. There is also a need to provide a residential telephone system with an integrated messaging system that may be remotely configured. The invention disclosed herein addresses these as well as other needs of residential telephone users.

SUMMARY OF THE INVENTION

Recognizing these and other needs for improved call management for residential telephone users, the invention relates to a residential telephone system that screens incoming telephone calls based on user-defined call-processing parameters and characteristics. The invention also relates to a system for remotely administering and configuring a residential telephone system. The invention further relates to a system and method for call management of incoming calls by a residential telephone system.

In one aspect, the invention relates to a telephone system for use by a residential user. The residential telephone system is electrically coupled to an external telephone service facility and electrically coupled to a user telephone. The system comprises a telephone service facility interface for receiving an incoming call signal from the external telephone service facility and a user telephone interface for transmitting the incoming call signal to the user telephone and for receiving an administrative signal from the user telephone. The system also comprises a memory and a messaging module for storing in the memory a calling party message received from a calling party in the incoming call signal. The system further comprises a connection module responsive to the administrative signal received from the user telephone via the user telephone interface for receiving an incoming call signal and processing the incoming call signal to either connect the incoming call signal to the messaging module or to transmit the incoming call signal to the user telephone via the user telephone interface.

In another aspect, the invention relates to an apparatus for providing a residential telephone system. The system is electrically coupled to an external telephone service facility and electrically coupled to a user telephone. The system is configurable from a user of the user telephone contemporaneous with processing of an incoming call signal from a calling party. The apparatus comprises a telephone facility interface for receiving an incoming call signal from the external telephone facility and transmitting an outgoing call signal to the external telephone facility. The system also comprises a direct access module coupled to the telephone facility interface for processing the incoming call signal and the outgoing call signal. The apparatus comprises a codec coupled to the direct access module converting an analog signal to a digital signal and converting the digital signal to the analog signal. The apparatus further comprises a digital signal processor coupled to the codec for receiving the incoming call signal and transmitting a recorded announcement, a prompt, and a message. A memory stores one or more recorded announcements, one or more prompts, one or more messages as received by the digital signal processor, and an operating code. The digital signal processor and memory cooperate to operate in a messaging module mode. The apparatus further includes a ringing subscriber line interface circuit coupled to the digital signal processor providing telephone interface functions. A user telephone interface electrically couples the apparatus to the user telephone, the user telephone interface transmitting the incoming call signal to the user telephone. The apparatus also comprises a relay electrically coupled to the telephone facility interface, the ringing subscriber line interface circuit, and the user telephone interface. The relay has two mutually exclusive states, a default state electrically coupling the external telephone facility to the user telephone, and a second state electrically coupling the ringing subscriber line interface circuit to the user telephone. A processor is coupled to the direct access module, the digital signal processor, the codec, the ringing subscriber line interface circuit and relay. The processor utilizes the operating code having an administrative parameter for controlling an operation of the direct access module, digital signal processor, codec, ringing subscriber line interface circuit and relay, and enabling a specification of the administrative parameter without initiating an off-hook state on the external communication facility.

In yet another aspect, the invention relates to a central server for remotely administering a residential telephone system. The central server comprises a memory for storing a configuration parameter and an administrative parameter. The server also comprises a first communication interface for transmitting the administrative parameter and the configuration parameter to a remote computer and for receiving a user instruction from the remote computer. A second communication interface is for transmitting an administrative instruction to the residential telephone system. The central server further comprises a processor configured to associate the configuration parameter with the administrative parameter and to transmit the administrative instruction to the residential telephone system responsive to the received user instruction.

In another aspect, the invention relates to a system for remotely administering a residential telephone system. The system comprises a remote computer configured to receive an administrative parameter and a configuration parameter from a central server and receive input from a user. The remote computer is further configured to transfer a user instruction to the central server responsive to the received user input. The system also comprises a central server configured to transmit the administrative parameter and the configuration parameter to the remote computer, and receive the user instruction. The central server is further configured to transmit an administrative instruction to the residential telephone system responsive to the received user instruction. The system further comprises a residential telephone system configured to be electrically coupled to an external telephone service facility and a user telephone for processing telephone calls to and from the external telephone service facility and the user telephone. The residential telephone system is configured to receive the administrative instruction and perform an administrative operation responsive to the received administrative instruction.

In still yet another aspect, the invention is a method of operating a residential telephone system, the system electrically coupled to an external telephone service facility and electrically coupled to a user telephone, the method comprising: receiving an incoming call signal, the incoming call signal comprising a calling party number and a calling party passcode; comparing the received calling party passcode to one or more authorized caller passcodes stored in a memory; and storing in the memory the received calling party number when the received calling party passcode matches one of the authorized caller passcodes stored in the memory.

In another aspect, the invention is a method of operating a residential telephone system that is electrically coupled to an external telephone service facility and electrically coupled to a user telephone. The method comprises receiving an incoming call signal that includes a calling party number, a calling party passcode, and a calling party message. The method also comprises comparing the received calling party passcode to one or more direct message routing passcodes stored in a memory. The method further comprises storing the received calling party message in a messaging module when the received calling party passcode matches one of the direct message passcodes stored in the memory.

In another aspect, the invention is a method of operating a residential telephone system that is electrically coupled to an external telephone service facility and electrically coupled to a user telephone. The method comprises receiving an incoming call signal that includes a calling party message. The method includes storing the received calling party message in a messaging module and ringing the user telephone contemporaneous with storing the received incoming call message in the messaging module.

In yet another aspect, the invention is a method of operating a residential telephone system that is electrically coupled to an external telephone service facility and electrically coupled to a user telephone. The method comprises receiving an incoming call signal that includes a calling party message. The method also comprises storing the received calling party message in a messaging module and transmitting a text message to the user telephone contemporaneous with the storing of the calling party message. The transmitted text message being something other than a calling party number of the incoming call signal.

In another aspect, the invention is a method of operating a residential telephone system that is electrically coupled to an external telephone service facility and electrically coupled to a user telephone. The method comprises receiving an incoming call signal that includes a calling party message. The method also comprises storing the calling party message in a messaging module and transmitting the received calling party message to the user telephone contemporaneous with the storing of the calling party message. The method further comprises receiving a user instruction during the storing of the calling party message and terminating the storing of the received calling party message in response to the received user instruction. The method further comprises connecting the received incoming call signal to the user telephone in response to the received user instruction.

In another aspect, the invention is a method of operating a residential telephone system that is electrically coupled to an external telephone service facility and electrically coupled to a user telephone. The method comprises receiving an incoming call signal from the external telephone service facility and connecting the received incoming call signal to either the user telephone or to a messaging module. The method also comprises receiving an administrative instruction from the user telephone, the administrative instruction being associated with an operation of the residential telephone system and not associated with the received incoming call signal. The method further comprises that the receiving of the incoming call signal and the connecting of the incoming call signal are each contemporaneous with receiving the administrative instruction.

In still another aspect, the invention is a method of operating a residential telephone system that is electrically coupled to an external telephone service facility and electrically coupled to a user telephone. The method comprises receiving an incoming call signal from the external telephone service facility, the incoming call signal comprising an administrative instruction. The administrative instruction being associated with an administrative operation of the residential telephone system and not being associated with the incoming call signal. The method also comprises storing the administrative instruction in a memory and operating one or more functions of the residential telephone system responsive to the stored administrative instruction.

In another aspect, the invention is a method of administering a residential telephone system over a first network by a central server receiving user instructions from a remote computer connected by a second network with the central server. The method comprises transmitting an administrative parameter and a configuration parameter to the remote computer over the second network. The method also comprises receiving at the central server a user instruction from the remote computer over the second network. The method further comprises transmitting an administrative instruction to the residential telephone system over the first network responsive to the user instruction.

In another aspect, the invention is a method for remotely administering a residential telephone system. The method comprises receiving at a remote computer an administrative parameter and a configuration parameter from a central server. The method also comprises receiving at the remote computer a user input and transmitting a user instruction from the remote computer to the central server responsive to the user input. The method further comprises storing at the central server the administrative parameter and configuration parameter and transmitting the administrative parameter and the configuration parameter from the central server to the remote computer. The central server receives the user instruction from the remote computer and transmits an administrative instruction to the residential telephone system responsive to the received user instruction. The residential telephone system receives the administrative instruction from the central server and performs an administrative operation responsive to the received administrative instruction.

Other aspects and features of the present invention will be in part apparent and in part pointed out hereinafter.

BRIEF DESCRIPTION OF THE DRAWINGS

The invention is further understood in part by referring to the drawings.

Corresponding reference characters and designations generally indicate corresponding parts throughout the drawings.

DETAILED DESCRIPTION

Figure 1:
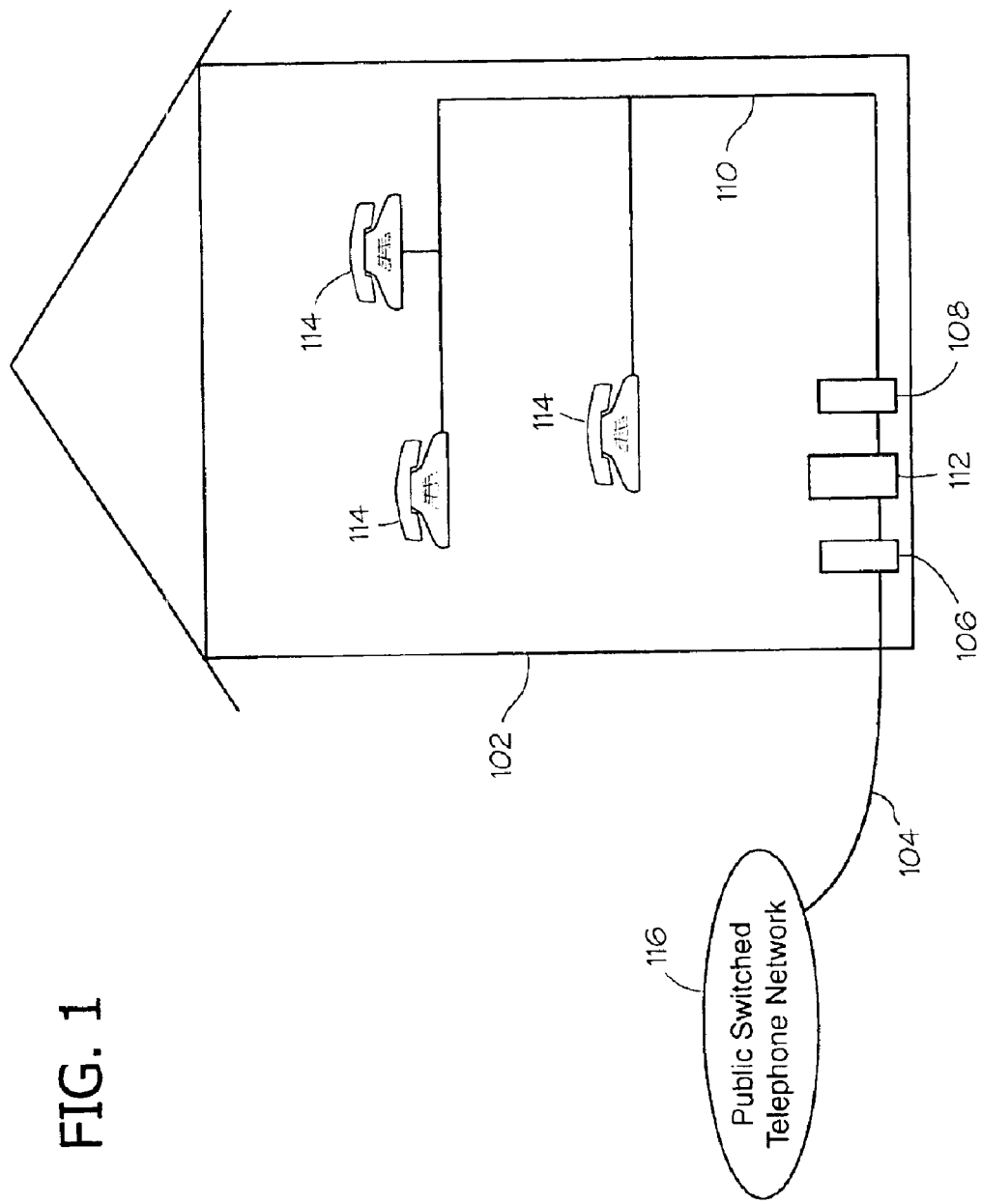
FIG. 1 is an illustration of a schematic layout and interconnection arrangement according to one embodiment of the invention.

Referring to FIG. 1, in one embodiment a residential telephone system (RTS) 112 is electrically coupled to an external telephone line 104 at a point of demarcation 106 within or near a user premise 102. RTS 112 is also electrically coupled via an electrical interface 108 to an internal telephone line 110 that connects to one or more user telephones 114. External telephone service line 104 regards the Tip and Ring connections of a Plain Old Telephone System (POTS) or Public Switched Telephone Network (PSTN) 116 at or near the electrical point of entry (point of demarcation 106) into the user's premises. Point of demarcation 106 may be terminated in a Network Interface Device (NID) (not shown). External telephone service line 104 also regards the Tip and Ring connections of the user's external telephone line at the electrical point of entry into the Residential Telephone System 112. The internal telephone line 110 regards the Tip and Ring connections of the internal telephone line 110 at an electrical interface 108 of RTS 112.

RTS 112 in cooperation with internal telephone line 110 and user telephone 114 handles or manages both incoming calls and outgoing calls. RTS 112 provides local central office functionality to user telephone 114. RTS 112 further incorporates an integrated voice message center (not shown) that permits the system to be installed at a remote location within user premise 102 without requiring a separate telephone answering machine. By this arrangement, unique call screening features are provided as will be described. The various embodiments of RTS 112 described herein provide an unprecedented set of incoming call management features not previously available to residential telephone users, including an unprecedented combination of privacy and convenience features.

Because RTS 112 incorporates a full-function internal telephone line interface 108 and the external telephone line interface 106, RTS 112 provides central office-like performance and features to the residential user that have not been previously available to residential users. Because the system is designed to control all the user telephones 114 in the user premise 102, installation at a location electrically near the point of entry of the external telephone line 104 into the user premise 102 is desirable. The physical installation of RTS 112 may be anywhere in user premise 102 the user wishes. In one embodiment, RTS 112 includes an integrated voice messaging capability.

Figure 4:
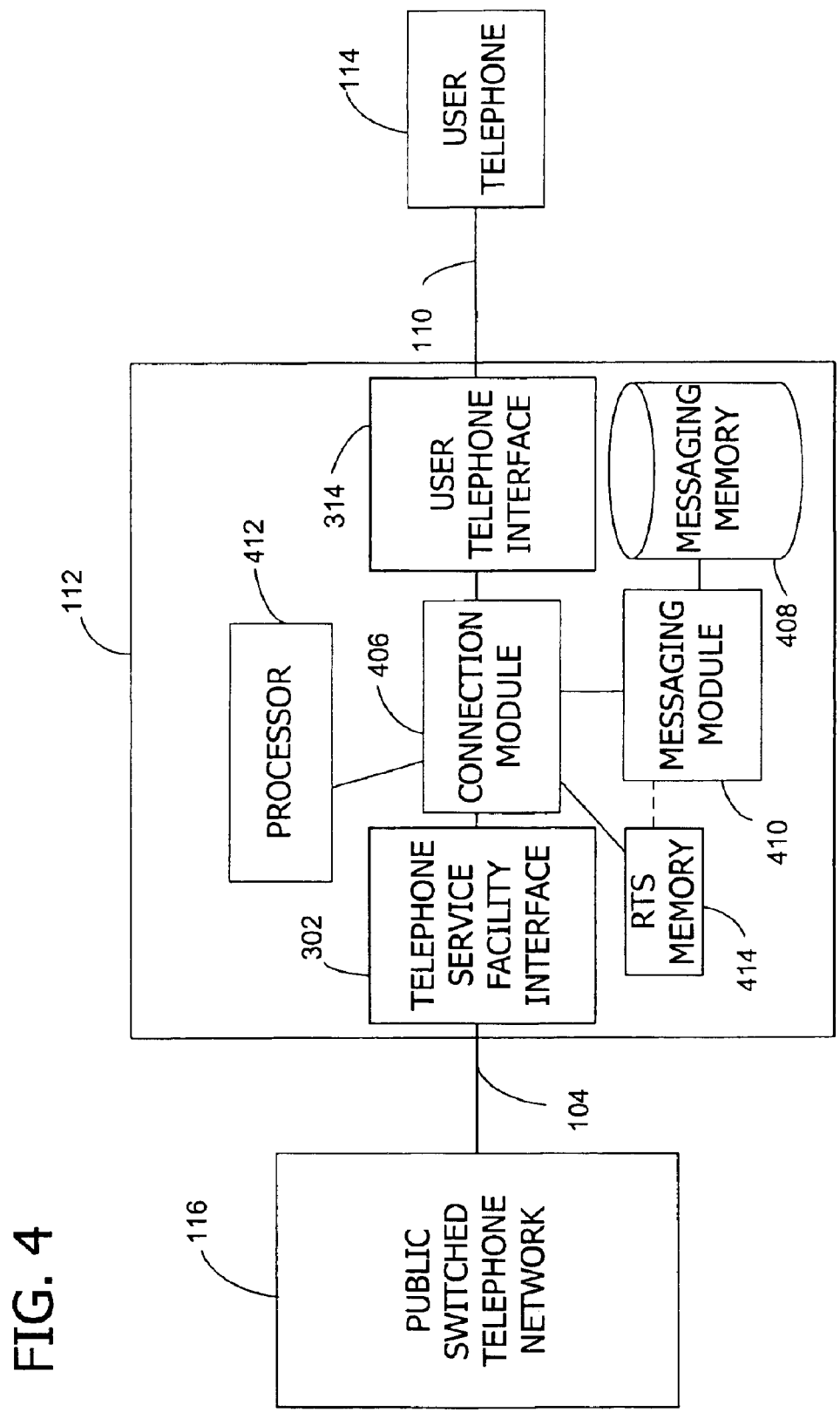
FIG. 4 is a block diagram illustrating another embodiment of a Residential Telephone System (RTS).

Referring now to FIG. 4, one embodiment of RTS 112 comprises a telephone service facility interface 302 for receiving an incoming call signal from external telephone line 104. External telephone line 104 is connected to public switched telephone network (PSTN) 116. RTS 112 also comprises a user telephone interface 314 that is connected to internal telephone line 110 for transmitting the incoming call signal to user telephone 114 and for receiving an administrative signal from user telephone 114. RTS includes a memory 414. A messaging module 410 provides for storing in memory 414 a calling party message received from a calling party in the incoming call signal. In the alternative, a separate messaging memory 408 may be provided. RTS 112 also comprises a connection module 406 that is responsive to the administrative signal received from user telephone 114 via user telephone interface 314. The administrative signal related to receiving an incoming call signal and processing the incoming call signal to either connect the incoming call signal to messaging module 410 or to transmit the incoming call signal to user telephone 314 via user telephone interface 314.

In one embodiment, memory 414 contains one or more authorized calling party numbers which had been previously stored in memory 414 by one of the configuration systems and methods described later. RTS 112 receives the incoming call signal on external telephone line 104 wherein the incoming call signal includes a calling party number. When RTS 112 receives the incoming call signal, connection module 406 connects the incoming call signal to user telephone interface 314 if the calling party number in the incoming call signal matches one of the authorized calling party numbers stored in memory 414. In operation, RTS 112 receives the incoming call signal that inlcudes the calling party number and the calling party passcode. RTS 112 compares the received calling party passcode to one or more authorized caller passcodes stored in memory 414. When the received calling party passcode matches one of the authorized caller passcodes stored in memory 414, the received calling party number is stored in memory 414 as one of the authorized calling party numbers.

In another embodiment, memory 414 includes one or more user pre-defined authorized caller passcodes. RTS 112 receives the incoming call signal that includes a calling party passcode for authenticating the calling party. When the received calling party passcode matches one of the authorized caller passcodes stored in memory 414, connection module 406 is configured to connect the incoming call signal to user telephone interface 314.

In another embodiment, memory 414 includes one or more stored authorized caller numbers and one or more stored user pre-defined authorized caller passcodes for authenticating the calling party. RTS 112 receives the incoming call signal that includes a calling party number and an authorized caller passcode. When the calling party passcode in the incoming call signal matches one of the authorized caller passcodes stored in memory 414, connection module 406 stores in memory 414 the calling party number received in the incoming call signal.

In another embodiment, memory 414 includes one or more direct message routing passcodes stored in a memory. RTS 112 receives an incoming call signal that comprises a calling party number, a calling party passcode, and a calling party message. RTS 112 compares the received calling party passcode to the one or more direct message routing passcodes stored in memory 414. When the received calling party passcode matches one of the direct message passcodes stored in the memory, the calling party message is stored by messaging module 410.

In still yet another embodiment, memory 414 includes one or more stored direct message routing passcodes that have been pre-defined by the user. RTS 112 receives the incoming call signal that includes a calling party passcode for authenticating the calling party. When the received calling party passcode matches one of the direct message routing passcodes stored in memory 414, connection module 406 is configured to connect the incoming call signal to the messaging module 410 without transmitting a ringing signal to the user telephone interface.

In another embodiment, RTS 112 receives the incoming call signal that includes a calling party message. Connection module 406 connects the incoming call signal to messaging module 410 for receiving the calling party message and causes a message ringing signal to be transmitted to user telephone interface 314. In an optional arrangement of this embodiment, the ringing signal is transmitted contemporaneous with the storing of the calling party message.

In another embodiment, RTS 112 receives the incoming call signal that includes a calling party message. Connection module 406 connects the incoming call signal to message module 410 for receiving and storing the calling party message. Additionally, connection module 406 transmits a copy of the calling party message to user telephone interface 314 when user telephone interface 314 is placed in an off-hook mode during the receiving of the calling party message without being detectable at the telephone service facility interface 302.

In still yet another embodiment, connection module 406 is configured to connect the calling party signal to user telephone interface 314 and to disconnect the incoming call signal from messaging module 410 when an administrative signal is received from user telephone interface 314.

In another embodiment, connection module 406 is configured to connect the incoming call signal to messaging module 410 and to transmit a text message to user telephone interface 314. The transmitted text message being something other than a calling party number of the incoming call signal. In an optional arrangement of this embodiment, the transmitting of the text message to user telephone 114 is contemporaneous the storing of a calling party message contained in the incoming call signal.

In another embodiment, the administrative signal is initiated from user telephone 114 being in an off-hook mode and connection module 406 is configured to receive the administrative signal. Connection module 406 is also configured to signal telephone service facility interface 302 that user telephone 114 is in an on-hook mode even though user telephone 114 is actually in the off-hook mode. Connection module 406 is configured to receive an incoming call signal from the telephone service facility interface 302 contemporaneous with user telephone 114 being in the off-hook mode.

In another embodiment, RTS 112 receives an incoming call signal including a calling party message. The received calling party message is stored in messaging module 410. RTS 112 transmits the received calling party message to the user telephone contemporaneous with the storing of the calling party message. RTS 112 receives a user instruction during the storing of the calling party message. Upon receipt of the user instruction, RTS 112 terminates the storing of the received calling party message and connects the received incoming call signal to user telephone 114.

In an alternative embodiment, RTS 112 receives an incoming call signal from external telephone line 104. RTS 112 connects the received incoming call signal to either user telephone 114 or messaging module 410. RTS 112 receives an administrative instruction from user telephone 114. The administrative instruction being associated with an operation of the residential telephone system and not associated with the received incoming call signal. In one optional embodiment, the receiving of the incoming call signal and the connecting of the incoming call signal are each contemporaneous with the receiving the administrative instruction.

In another embodiment, RTS 112 receives a calling party signal that is a data signal generated by a remote computer. The data signal contains a remote administrative instruction. Processor 412 receives the data signal and the remote administrative instruction and controls one or more operation of RTS 112, connection module 406, or messaging module 410 responsive to the received remote administrative instruction.

In another embodiment, connection module 406 is configured to detect one or more events related to the external telephone line 104 including a momentary loop current reversal, a loop current interruption, a call progress tone, and a pre-determined period of silence. When one or more of these events are detected, connection module 406 initiates a disconnection from external telephone line 104.

In another embodiment, telephone service facility interface 302 receives an administrative instruction from a remote computer. Memory 414 includes stored operating software for the operation of one or more functions of RTS 112 or components thereof. Memory 414 also includes one or more configuration parameters. Connection module 406 is configured to process incoming call signals responsive to the stored operating software, one or more of the stored configuration parameters, and the received administrative instruction. The administrative instruction may be any RTS 112 operating instruction including one or more of the following: operating system software, a diagnostic instruction, diagnostic software, feature software, a feature parameter, feature data, and a diagnostic query. Similarly, the configuration parameter may be any parameter defining one or more configurations or features of RTS 112 including one or more of the following: operating software data, a feature parameter, feature data, system status parameter, and a diagnostic parameter. In an optional embodiment, connection module 406 transmits the configuration parameter to the remote computer via the telephone service facility interface 302.

In another alternative embodiment, RTS 112 receives an incoming call signal from external telephone line 104. The incoming call signal comprises an administrative instruction that is associated with an administrative operation of the residential telephone system and not being associated with the incoming call signal. Upon receipt, the administrative instruction is stored in memory 414. RTS 112 operates or performs one or more functions responsive to the received and stored administrative instruction.

Figure 3:
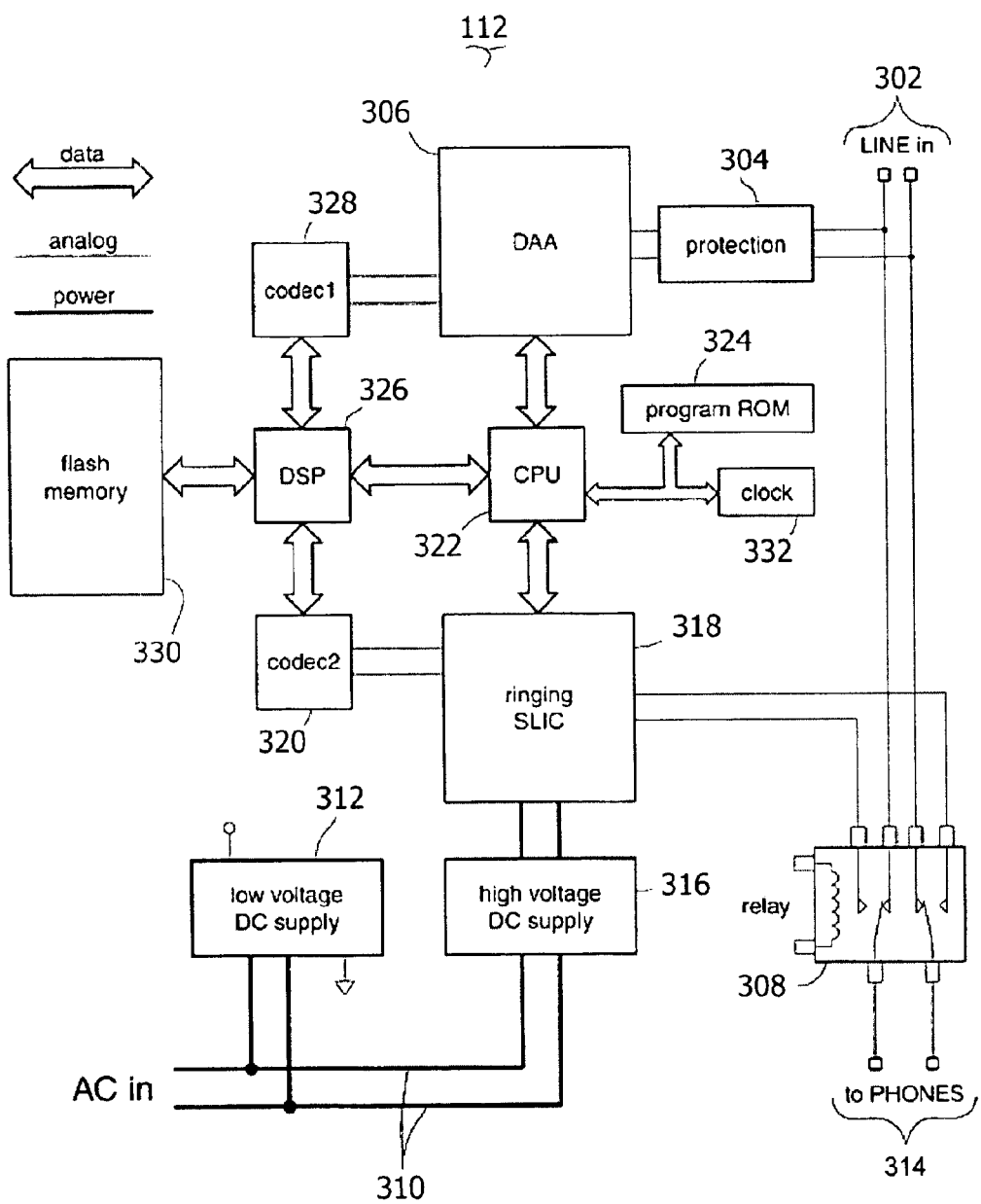
FIG. 3 is a block diagram illustrating electronic components of a Residential Telephone System (RTS) according to one embodiment of the invention.

Referring now to FIG. 3, one embodiment of an electronic hardware implementation of RTS 112 is illustrated. Each of the illustrated blocks of FIG. 3 represents electronic circuits that perform as described and produce the described embodiment. It should be understood that each of the described functions might be performed in one or more hardware components, firmware or software or combined into fewer components. RTS 112 anticipates each of such variations as the embodiment described in FIG. 3 is only one such embodiment. The illustration of electronic components and their identified function are for illustration purposes only and are not intended to be limiting.

As noted earlier, the telephone line interface 302 provides an interface external telephone line 104 for receiving an incoming call signal from the external telephone line 104 and transmitting an outgoing call signal. A protection module 304 is placed across the Tip and Ring conductors of external telephone line 104. Protection module 304 is designed to comply with required network interface standards as necessary to obtain necessary regulatory agency approvals. Protection module 304 also provides protection of other RTS 112 electronic modules against lightning, catastrophic power line cross, and other unavoidable voltage surges occurring during attachment to external telephone line 104 and the events manifested at or near external telephone line 104. Protection module 304 may consist of some combination of crowbar devices, varistors, and various devices intended for such an application, and altogether providing a solution to the design requirements of the protection module 304. A Direct Access Arrangement module (DAA) 306 benefits immediately from the protection afforded it by protection module 304.

DAA 306 consists of one or more electronic circuits to provide means for connecting to external telephone line 104. DAA 306 includes a transconductance stage, means for ring detection, hookswitch means, and means for determining the state of external telephone line 104. The transconductance stage includes a 2-to-4 wire hybrid providing correct AC/DC termination. DAA 306 additionally includes means for differential amplification while maintaining longitudinal balance across a barrier of galvanic isolation. The exact value of isolation is specified by regulatory agencies and industry standards. DAA 306 enables RTS 112 to complete duplex communications of either analog or digital signals.

As noted, DAA 306 provides for processing the incoming call signal and the outgoing call signal. In one embodiment DAA 306 comprises a conversion module for converting the incoming call signal from a two-wire mode to a four-wire mode; a conversion module for converting the outgoing call signal from the four-wire mode to the two-wire mode; a monitoring module for monitoring the communication signal for one or more of the following: a ring detection, a hook detection, a loop current reversal, and a loop current interruption; a hookswitch module for providing a hookswitch function; a differential amplification module for maintaining longitudinal balance across a barrier of galvanic isolation; and an overvoltage protection module.

A codec1 328 is electronically coupled to DAA 306 and provides for the conversion of the incoming telephone signal from an analog signal to a digital signal and converting the digital signal to the analog signal as necessary for call processing.

An electromagnetic or electromechanical relay 308 is electrically connected between the external telephone line 104 and internal telephone line 110 within RTS 112. Relay 308 consists of a dual metallic contact set and an electrically isolated energizing coil contained within a common assembly, often termed a DPDT (Double-Pole, Double-Throw) relay type. Relay 308 provides a "deadman" connection in its relaxed or de-energized state, wherein the Tip and Ring conductors of external telephone line 104 electrically connect to the Tip and Ring conductors of internal telephone line 110, while continuing to maintain electrical separation between the Tip and Ring conductors. Relay 308 is depicted in its relaxed or un-energized state in FIG. 3, wherein the Tip and Ring conductors of internal telephone line 110 are illustrated as being connected to the common terminals of the dual contact set. The normally closed terminals are illustrated to be connected to the Tip and Ring conductors of external telephone service line 104. One benefit of the described arrangement is to provide a "failsafe" connection of user telephone 114 to external telephone line 104 during all operations including during the loss of local electricity. An additional benefit of the described arrangement is a certainty that high voltages applied to user telephone 114 in user premise 102 by RTS 112 during normal operation are separated from external telephone line 104 by virtue of the mutually exclusive arrangement provided by the dual contact set of relay 308.

In one embodiment, relay 308 a relay electrically coupled to the telephone facility interface 302, a ringing SLIC 318, and the user telephone interface 314. In such as case, relay 308 has two mutually exclusive states: a default state electrically coupling external telephone facility 104 to user telephone 114, and a second state electrically coupling ringing SLIC 318 to user telephone 114.

AC IN 310 represents the Hot and Neutral connections of the main AC power line of user premise 102. AC IN 310 is the source of AC power for a low voltage DC supply 312 and a high voltage DC supply 316. While in some conditions necessary power may be derived from external telephone line 104, it may not be always be possible to derive all the required power from external telephone line 104. Alternatively, a DC converter may derive one necessary DC supply voltage from another DC supply, possibly simplifying the electronic implementation. Galvanic isolation between AC IN 310 and the output of DC supply 316 is also provided.

A ringing Subscriber Line Interface Circuit (SLIC) module 318 in conjunction with a codec2 320 (COder/DECoder) provides necessary central office linecard functions of BORSCHT (Battery, Overvoltage protection, Ringing, Supervision, Codec, Hybrid, and Testing). In addition, frequency shift keying (FSK) signals related to Caller ID signal generation is provided as necessary to retransmit Caller ID information to user telephone 114. A complete audio transmit and receive path is integrated, including DTMF decoding, AC impedance, and 2-wire to 4-wire hybrid. The output of ringing SLIC 318 is applied to the Tip and Ring conductors of internal telephone line 110 and therefore to user telephone 114. A ringing signal may be applied to user telephone 114 by ringing SLIC 318 when commanded to do so by CPU 322. Ringing SLIC 318 may synthesize the ringing signal from the high voltage DC supply or the ringing signal may be locally generated. A function Ringing includes ring trip detection for detecting an off-hook condition, while the ringing signal is being applied to user telephone 114. A function Battery relies on the DC supply 316 for power. A linefeed provides on-hook voltage, off-hook loop current, reverse battery operation, and loop or ground start operation. The linefeed is necessary to monitor the hookswitch of user telephone 114 when the ringing signal is not being applied to user telephone 114. Upon placing user telephone 114 in an off hook mode to place an outgoing telephone call, the forward flow of current is detected by ringing SLIC 318. The detection is reported to CPU 322. CPU 322 responds by de-energizing the coil of relay 308 thereby releasing the dual contact set resulting in connection of user telephone 114 to external telephone line 104. Testing provides the means for various diagnostic functions such as power monitoring and line fault detection of the local circuit including internal telephone line 110 and user telephone 114. Overvoltage protection means may also be provided.

In another embodiment, ringing SLIC module 318 comprises a line-powering module; a second overvoltage protection module; a ringing module; a ring trip detection module; a line supervision module that comprises detecting an on-hook mode; an analog to digital conversion module; a digital to analog conversion module; a hybrid-interfacing module for interfacing a two-wire circuit to a four-wire circuit; a testing module; and an FSK transmitting module for transmitting frequency shift keying modulated signals.

CPU 322 represents means for initializing, controlling, responding to, and coordinating the functions of other modules in RTS 112. Such means are ordinarily provided by a microcontroller (not shown) that may contain integrated memory necessary for the sequential execution of programmed instructions. Alternatively, a microprocessor may be associated with an external memory means as illustrated in FIG. 3. A program ROM 324 represents an external memory means. CPU 322 may additionally include clock 332 oscillator means, commonly governed by a crystal device, and supervisory means that enables CPU 322 to recover from a fault condition. Alternatively, a Digital Signal Processor (DSP) 326 may perform intelligent functions commensurate with those of the described CPU 322.

In one embodiment, CPU 322 is coupled to DAA 306, a DSP 326, a codec1 328, a ringing SLIC 318, and relay 308. In such an embodiment, CPU 322 utilizes operating code having an administrative parameter for controlling an operation of DAA 306, DSP 326, codec1 328, codec2 320, ringing SLIC 318, and relay 308. CPU 322 enables a specification of the administrative parameter without initiating an off-hook state on the external communication facility.

As noted CPU 322 utilizes operating code having an administrative parameter for controlling an operation of DAA 306, DSP 326, codec1 328, codec2 320, ringing SLIC 318, and relay 308. In one embodiment, the specified administrative parameter comprises one or more of the following: receive a recorded message, hear an embedded voice prompt, record an outgoing greeting, edit a caller passcode, edit an authorized calling party number, configure a programmable parameter, define a ringing signal, transmit the administrative parameter, receive the administrative parameter, transfer a system characteristic, transfer a configuration setting, receive operating code, receive diagnostic data, send diagnostic data, and initiate diagnostic testing. The specified administrative parameter may be specified by RTS 112, its operating software, or by a user either locally or remotely either by DTMF input or via an electronic interface such as a locally hosted or remotely hosted webpage.

In one embodiment, the administrative parameter may include operating software. In such an embodiment, RTS 112 or one or more of its components such as CPU 322 may be configured to receive the operating software, to store the operating software, and to thereafter operate RTS 112 as a function of the received operating software.

In another embodiment, the administrative parameter may be a diagnostic instruction requesting a diagnostic parameter. In such an embodiment, RTS 112 or one of its components such as CPU 322 may be configured to receive the diagnostic instruction and to initiate a diagnostic operation of RTS 112 responsive to the received diagnostic instruction. In performing the diagnostic operation, CPU 322 may determine a diagnostic parameter. In such cases, CPU 322 may transmit the determined diagnostic parameter to a remote computer.

RTS 112 may be configured such that RTS 112 processes an incoming call signal contemporaneous with the user of the user telephone specifying an administrative parameter via user telephone 114.

DSP 326 provides means for performing centralized signal processing in conjunction with the aforementioned centralized controlling means. DSP 326 communicates directly with codec1 328 accompanying DAA 306, whereby duplex communication signals associated with external telephone line 104 are converted from digital to analog, and from analog to digital, as necessary. Similarly, DSP 326 communicates directly with codec2 320 accompanying ringing SLIC 318, whereby duplex communication signals associated with user telephone 114 are converted from digital to analog, and from analog to digital, as necessary.

Additionally, DSP 326 both stores and retrieves digital recordings placed in an organized fashion in a flash memory 330. Although flash memory 330 is presently ideally suited for the described purpose of non-volatile digital storage, various other technologies such as battery-backed RAM may be implemented instead.

A clock 332 represents regular and reliable electronic means for setting and maintaining real time and day. Additionally, time and day information may be extracted from an incoming Caller ID signal.

The user telephone interface 314 provides electrical coupling to internal telephone line 110 thereby providing electrical coupling to user telephone 114. User telephone interface 314 transmits the incoming call signal to the user telephone 114. The user telephone interface 314 is the output of relay 308.

In another embodiment, an incoming call signal received by RTS 112 via external telephone line 104 may comprise an incoming computer signal generated by a remote computer. Such incoming computer signal may comprise any type of computer data including an administrative instruction specifying an administrative parameter. In such a case, CPU 322 controls one or more operations of DAA 306, DSP 326, codec1 328, codec2 320, ringing SLIC 318, and relay 308 to process the incoming computer signal and to verify that the incoming computer signal is an authorized computer signal. In such an embodiment, CPU 322 is configured to implement the administrative parameter specified by the administrative instruction.

In operation, RTS 112 provides the one or more call management features described above. One embodiment of the operation of RTS 112 for call screening will now be described.

In one embodiment, RTS 112 performs local call screening utilizing a passcode method in conjunction with received calling party number (CPN) data from a telephone company provided Caller ID service to automatically recognize familiar callers. Familiar callers (as designated by authorized calling party telephone numbers stored in memory) are allowed to terminate the incoming call signal on user telephone 114 with only minimal delay without entering the passcode each time. When such an incoming call is received, RTS 112 duplicates the received Caller ID information and retransmits the Caller ID information to user telephone 114 in association with ringing. As such, the incoming call signal includes providing Caller ID to Caller ID display associated with user telephone 114. A calling party that does not know the correct passcode may be treated in a variety of user definable methods according to the configuration of user programmable features.

One user programmable option is for RTS 112 to exclude all callers who do not have the passcode. In such an option, the calling party call is terminated without allowing the calling party to leave a message or without ringing user telephone 114. In the alternative, RTS 112 may provide a caller not knowing the passcode to leave a message for the user's later review. In such case, RTS 112 may not provide a ringing signal to user telephone 114. As yet another option, when the calling party does not know the passcode, RTS 112 is invited by a voice prompt or message to leave a message and upon doing so, RTS 112 provides a ringing signal to user telephone 114. Such ringing signal may be a unique ringing signal. As an option, if the user answers the phone by placing user telephone 114 in the off hook mode, RTS 112 provide user telephone 114 with a copy or duplicated signal of the calling party signal including the calling party message. In such a manner, RTS 112 provides the user of user telephone 114 the ability to listen to the calling party message as it is being stored. RTS 112 prevents the calling party from being aware of the ringing of user telephone 114 or the user listening to the calling party leaving the message. As an additional option, RTS 112 may be configured to enable the user of user telephone 114 to provide an instruction such as a voice command or a DTMF signal. Upon receipt of such instruction, RTS 112 can immediately connect user telephone 114 to external telephone line 104, and terminate the storing of the calling party message. As an option, RTS 112 may be configured to erase the partially recorded calling party message.

Call screening first employs the passcode method for intercepting callers. In this embodiment, calling parties are assumed to have possession of the numerical passcode selected by the user, stored in RTS 112, and given to them prior to their attempting to place a call to the user via RTS 112. Calling parties may be recognized automatically on the basis of having previously entered the passcode successfully, and such callers are then allowed to rapidly pass through without entering the passcode each time. However, if the same calling party places a call from a different location, the passcode may be entered to allow the call to complete. This precludes Caller ID from being used as the sole determining means of recognizing a desirable and friendly caller. A desirable and friendly calling party is never completely blocked from terminating a call to the user via RTS 112. Caller ID is used to maximize the convenience to familiar callers. RTS 112 provides for the use of Caller ID for the specific purpose of maximizing convenience to familiar callers, but maintains the deterministic method of requiring calling parties to enter the correct passcode when Caller ID is not available. A list of familiar callers is stored by RTS 112 and may be edited by the user.

Upon first placing a telephone call to the user, a calling party is greeted by an electronically stored greeting that invites the calling party to enter a passcode. It is not necessary for a calling party familiar with the process to listen to the invitation in its entirety as the calling party may enter the correct passcode immediately even during the electronic greeting. Once the passcode is entered that matches a user defined authorized user passcode that is stored by RTS 112, RTS 112 stores the Caller ID information associated with the calling party or incoming call signal. The same Caller ID information is retransmitted along with the ringing signal and will appear on any displays that the user has attached to the system. As user telephone 114 is made to ring, a ringback tone is also presented to the calling party. Later, when the same calling party places another call to the user, the system recalls the familiar Caller ID of the corresponding calling party and allows them to pass unhindered, ringing user telephone 114 immediately. Because each call is treated in this way, this embodiment of the invention provides maximum of security to the user combined with maximum convenience to the calling party.

In another embodiment, the calling party who correctly enters the passcode may be sent to the voice message center when the user telephone 114 continue to ring beyond a predetermined number of times, perhaps because the user is absent. For the same caller, user telephone 114 can continue to ring even as a calling party message is being recorded. A ringback tone is not presented to the calling party during message recording.

If a calling party does not know the authorized caller passcode, an alternative passcode may be specified in the recorded invitation. When the calling party enters the alternative passcode or direct message routing passcode, the calling party is connected directly to voice message module 410 without ringing user telephone 114. Callers sent to voice message module 410 may immediately hear a personal greeting recorded beforehand by the user. Once connected to the voice message module 410, the calling party may record a message for the user.

Programmable features of RTS 112 enable the user to specify call management treatment of callers in a variety of ways. If the user chooses, user telephone 114 may begin to ring as the calling party is recording the message. If user telephone 114 is answered at that time, the user may listen to the calling party leaving the message, but without the calling party being aware of the user's presence. The user may either decide to reject the caller, or to be connected to them. This is an improvement over prior art systems that utilize a peripheral answering machine where the calling party must wait for additional ringing until the answering machine responds.

In another embodiment, a newly recorded message from a calling party is made known to the user by briefly ringing user telephone 114 in a unique manner and/or on a periodic basis. The user may then use user telephone 114 to listen to the recorded messages. The user may also be alerted to the presence of newly recorded messages upon lifting user telephone 114. Additionally, when the user places user telephone 114 in an off hook mode, voice message module 410 may be accessed by the user. Upon accessing voice message module 410, the user is separated from external telephone line 104 and communication between user telephone 114 and RTS 112 becomes dedicated to that between the user telephone 114 and RTS 112. If a calling party attempts to terminate a call via external telephone line 104 while the user is accessing voice message module 410, particularly if the calling party has entered the authorized caller passcode, RTS 112 provides an alert to the user to their presence of an incoming call.

Configuration Management

The programmable features of RTS 112 may be configured by several methods. A first method is local or remote DTMF configuration management. A second method is configuration management using a web-page interface, either locally hosted by RTS 112 or a webpage hosted by a central server 216 or a remote server 502.

A user may access RTS 112 from the user telephone 114. Once accessing by a secure access arrangement the configuration mode of RTS 112 the user navigates the configuration mode and responds to a series of voice prompts by entering selections via DTMF tones or voice instructions.

A user may configure the programmable features of this system by stepping through a menu consisting of a series of voice prompts, using only a telephone. An outgoing message may be recorded, the passcode registered, and other programmable features of this system chosen, without occupying the incoming telephone line. The user is not required to be in proximity to the system or to use special apparatus to do so. The user may also record personal greetings for callers while accessing the voice message center module of RTS 112 from user telephone 114.

In another embodiment, the user may retrieve messages left by callers or change his personal greeting from a remote location. To accomplish this type of remote configuration access, the user initiates an incoming call to the user residence 102 or telephone number associated with external telephone line 104. When receiving the incoming call, the user remotely accesses the configuration mode of RTS 112 by entering a separate security code. To access the voice message module of RTS 112, the user may enter either the same security access code or a unique security access code. These access codes are pre-determined by the user and stored in memory 414.

In another alternative embodiment, a graphical representation of RTS 112 and its features are made available to the user. Using a graphical representation such as in a webpage format, the user may choose from among the various features. A telephone connection is subsequently made to the user's system by a remote computer, and the programmable features rapidly and automatically configured according to the user's choices. Troubleshooting of the system is also provided by this method.

In the alternative embodiment, a graphical interface is made available to the user. Such a website may be hosted directly by RTS 112 and accessed by the user via a local computer (not shown) or a computer connected to a common network with RTS 112. Alternatively the website may be hosted by central server 216 or by a remote server 502. However hosted, the graphical interface represents the user's RTS 112 system configuration. Such a graphical interface may be configured to be visually intuitive and easy to understand. The user accesses the website and selects the desired configuration of programmable features.

Figure 2:
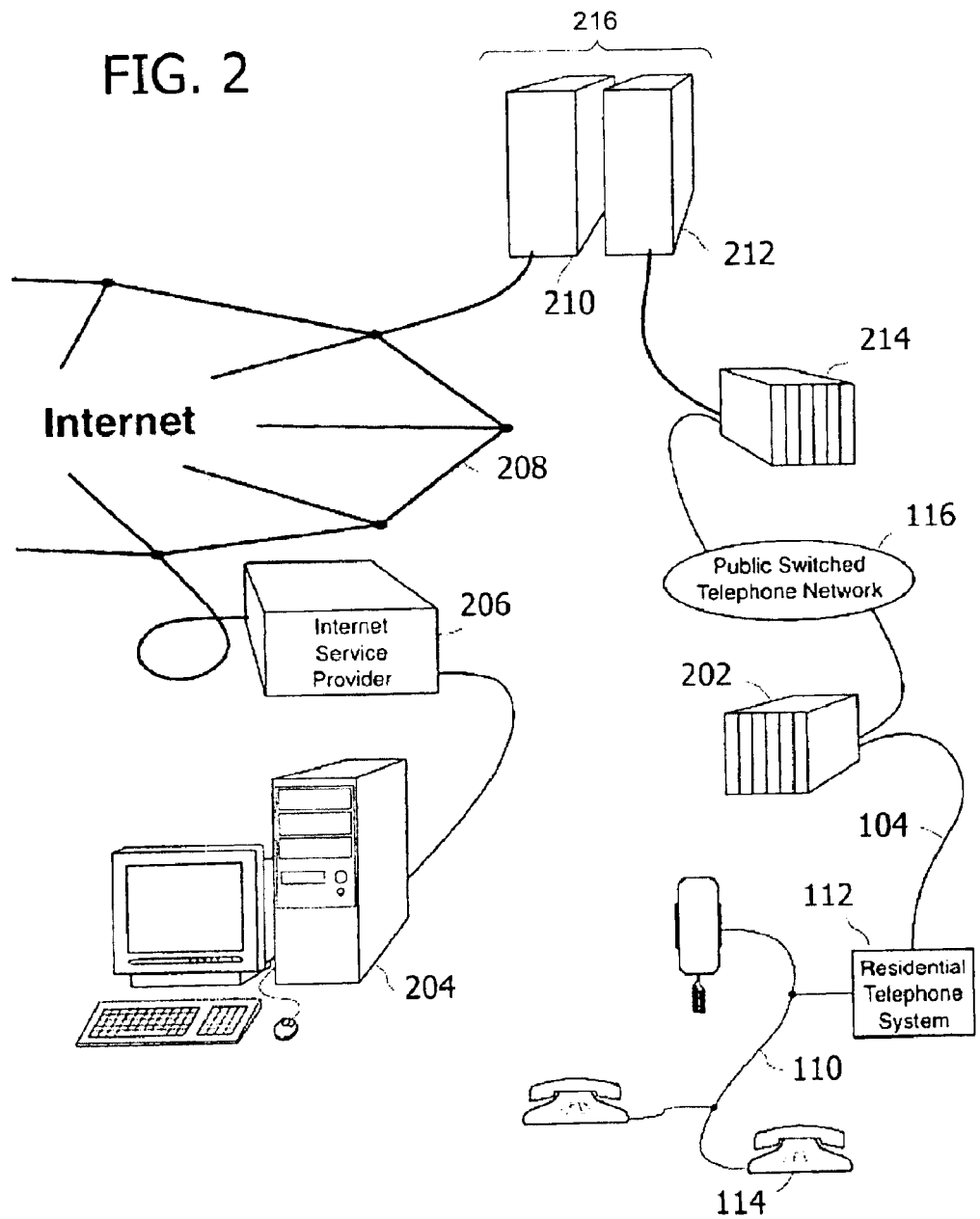
FIG. 2 is an illustration of a remote access configuration for a Residential Telephone System (RTS) according to one embodiment of the invention.

FIG. 2 illustrates one embodiment utilizing central server 216. In this arrangement, RTS 112 is connected to a local telephone company central office 202 serving external telephone line 104. The local central office 202 is connected to one or more public switched telephone networks 116 to another local central office 214 that serves central server 216. In the alternative, the communication facility or medium interconnecting central server 216 and RTS 112 may be any known communication network including a data network, or a wireless network.

Central server 216 may be of any configuration. For illustration purposes, central server 216 comprises two processing units a first central server unit 210 and a second central server unit. However, central server 216 may be any arrangement with any number of modules, processors, or other components, or may be a single integrated processing unit. Central server 216 is connected to a second network 208 that may be accessed by a remote computer 204. As illustrated, second network 208 may be an Internet to which remote computer 204 may also access, either directly or via an internet service provider 206. However, second network 208 may be any communications network configured to support communications between central server 216 and remote computer 204. This may include any public data network, a private data network, or a wireless network.

In this embodiment, after the user accesses the webpage hosted by central server 216 and as described above, central server 216 communicates with the user's RTS 112 system by making a standard incoming telephone call. Once a connection is made, central server 216 identifies itself and obtains secure access to RTS 112. Central server 216 communicates to rapidly configure RTS 112 according to the user's choices. This process begins with recognition by RTS 112, followed by a handshaking protocol then leading to the downloading of the configuration data. RTS 112 may also upload configuration information to central server 216, which may be reported to the user using the same graphical interface.

Central server 216 may also perform diagnostic routines while generating other important information that may be reported as well. Upon the user's return to the same graphical interface, the results uploaded from RTS 112 are made visible to the user in the webpage. Additionally, explanations and suggestions may be made to the user via the webpage regarding the existence of optional features.

In another embodiment, a system for remotely administering one or more RTS 112 systems may comprise a remote computer 204, a central server 216, RTS 112. Remote computer 204 is configured to receive an administrative parameter and a configuration parameter from central server 216 and receive input from a user. Remote computer 204 is configured to transfer a user instruction to central server 216 responsive to the received user input.

Central server 216 is configured to transmit the administrative parameter and the configuration parameter to the remote computer, and receive the user instruction, and further configured to transmit an administrative instruction to the residential telephone system responsive to the received user instruction.

RTS 112 is electrically coupled to external telephone line 104 and the internal telephone line 110 for processing telephone calls to and from the external telephone line 104 and user telephone 114. RTS 112 receives the administrative instruction and performs an administrative operation responsive to the received administrative instruction.

In another embodiment, the invention is a method for remotely administering one or more RTS 112 systems. The method includes one or more steps performed at remote computer 204, central server 216, and RTS 112 as described above. Remote computer 204 receives an administrative parameter and a configuration parameter from central server 216 and receives a user input from a user of remote computer 204. The administrative instruction and the administrative parameter may be one or more of the following: operating software, diagnostic software, a telephone feature, a feature parameter, feature data, and a diagnostic query. The configuration parameter may be one or more of the following: operating software information, a feature parameter, feature data, system status parameter, and a diagnostic parameter. Remote computer 204 transmits a user instruction to central server 216 responsive to the user input.

Central server 216 stores one or more administrative parameters and configuration parameters. Central server 216 transmits one or more administrative parameters and the configuration parameters to remote computer 204. Central server 216 receives the user instruction from remote computer 204 and transmits an administrative instruction to RTS 112 responsive to the received user instruction.

RTS 112 receives the administrative instruction from central server 216 and performs an administrative operation responsive to the received administrative instruction. As an optional embodiment, RTS 112 transmits the configuration parameter to central server 216.

Figure 5:
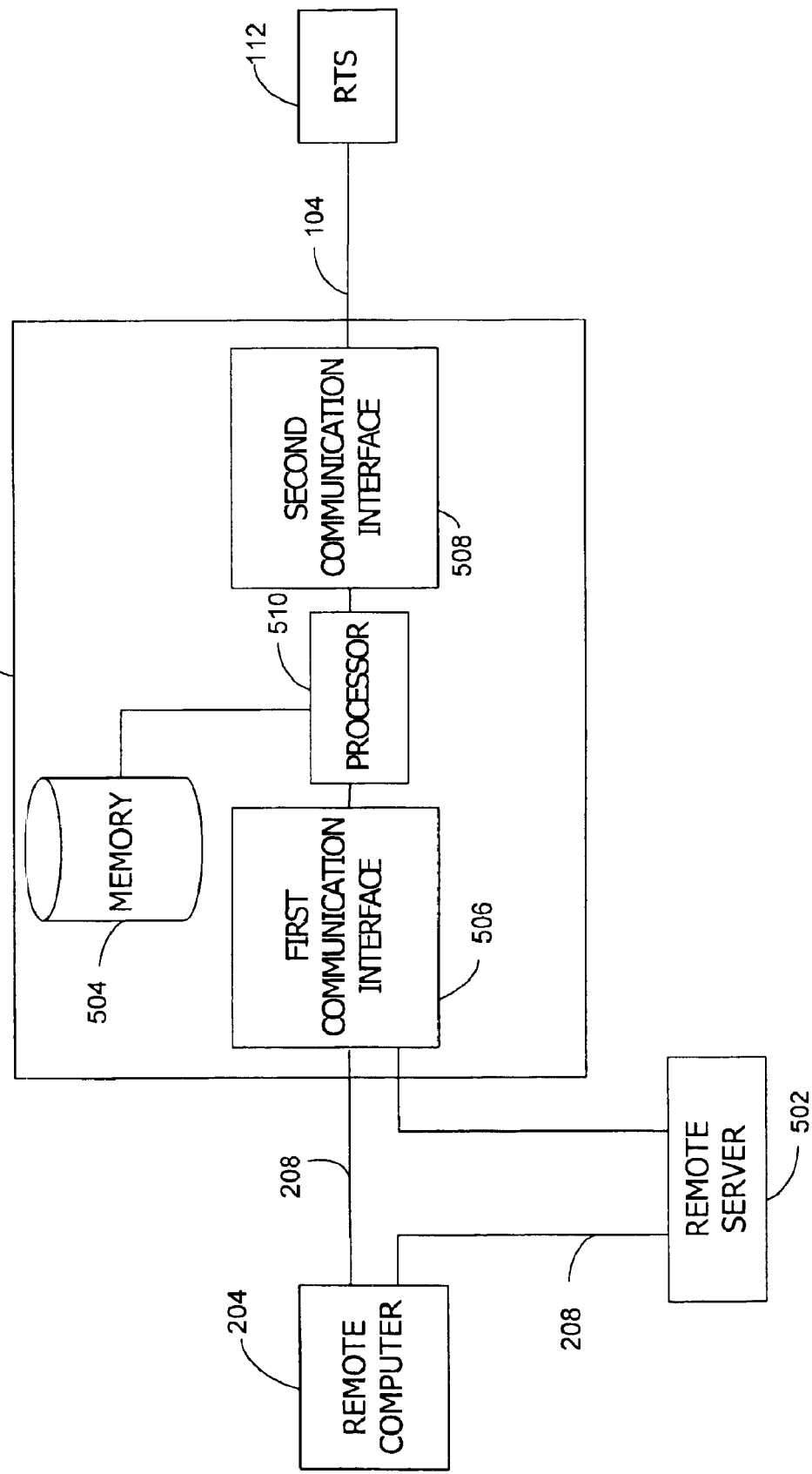
FIG. 5 is a block diagram illustrating one embodiment of a central server providing remote configuration management of a Residential Telephone System (RTS).

Referring now to FIG. 5, one embodiment of central server 216 is illustrated. Central server 216 comprises a memory 504 for storing one or more configuration parameters and administrative parameters associated with one or more RTS 112 systems. Memory 504 may comprise any form of local or remote memory means as is well known in the art including a database for storing and administering one or more administrative parameters and configuration parameters of one or more RTS 112 systems.

Central server 216 includes a first communication interface 506 for transmitting the administrative parameter and the configuration parameter to remote computer 204 and for receiving a user instruction from remote computer 204. First communication interface 506 is configured for communication with second network 208 and remote computer 204 is configured for communication with second network 208. Central server 216 receives the user instruction transmitted by remote computer 216 via second network 208 and transmits the administrative parameter and configuration parameter via second network 208.

Central server 216 also includes a second communication interface 508 for transmitting an administrative instruction to RTS 112. Second communication interface 508 is configured to receive the configuration parameter from RTS 112.

Central server 216 includes a processor 510 that is configured to associate the configuration parameter with the administrative parameter and to transmit the administrative instruction to RTS 112 responsive to the received user instruction. In an optional embodiment, processor 510 may be configured to host a webpage on second network 208 such as where the first network is the Internet. Remote computer 204 is any type of computer or processor configured with web browser software, web browser software being well known, to remotely access the hosted webpage. Remote computer 204 receives the configuration parameter from central server 216. A user of remote computer 204 inputs into remote computer 204 a selection of a user instruction that may be one of several means of providing input to a computer, including using a pointing device, a keyboard, voice recognition, etc. Remote computer 204 receives the user instruction and transmits the user instruction from remote computer 204 to central server 216 through the hosted webpage. In a similar manner, the hosted website may include the administrative parameter, thereby enabling the user to specify the administrative parameter. In such an embodiment, processor 510 transmits the administrative instruction comprising the user specified administrative parameter to RTS 112.

In another embodiment, processor 510 generates a user notification when transmitting the administrative instruction to RTS 112. The user notification may be any type of notification including one or more of the following: transmitting a distinctive ringing signal and a frequency shift keying modulated signal by the ringing subscriber line interface circuit to the user telephone system, the modulated signal being something other than a calling party number; sending an email over a network to a user defined email address; and initiating a message notification.

In yet another embodiment, the system may incorporate a remote server 502 also connected to second network 208. In this embodiment, remote server 502 may be a common server operated by an Internet Service Provider (ISP) or other service provider. Remote server 502 is configured to host a webpage similar to that discussed above. Remote server 502 being operably connected to second network 208 such that remote computer 204 configured with a web browser may access the hosted webpage and transmit a user instruction through the hosted web page to remote server 502. Remote server 502 transfers the user instruction to central server 216 via first communication interface 506.

As noted above, the administrative parameter and administrative instruction may comprise any type of operating parameter for RTS 112 system including one or more of the following: operating software, diagnostic software, feature software, a feature parameter, feature data, and a diagnostic query. Additionally, configuration parameter may be any type of configuration parameter for RTS 112 including one or more of the following: operating software information, a feature parameter, feature data, a configuration parameter, system status parameter, and a diagnostic parameter.

One embodiment of an operation of central server 216 includes transmitting the administrative parameter and the configuration parameter to remote computer 502 over second network 208. Central server 216 receives the user instruction from remote computer 204 over second network 208 and transmits the administrative instruction to RTS 112 over first network 104 responsive to the user instruction.

In the embodiment where central server 216 hosts a webpage, central server 216 receives the user instruction from remote computer 204 and transmits the administrative parameter and the configuration parameter to remote computer 204 via the webpage.

As may now be appreciated, the systems and methods herein described provide substantial advantages over the prior art. Such advantages include improved call management providing residential users with user definable privacy options not previously disclosed. Also among the advantages is remote configuration management of the residential telephone system. Significantly, the system and method herein described may also be adapted for use with existing residential telephone installations and inside wiring and with existing public switched telephone networks, public data networks, Internets, and private switched and data networks.

When introducing elements of the present invention or preferred embodiments thereof, the articles "a", "an", "the", and "said" are intended to mean there are one or more of the elements. The terms "comprising", "including", and "having" are intended to be inclusive and mean that there may be additional elements other than the listed elements.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A telephone system for use by a residential user, the system electrically coupled to an external telephone service facility and electrically coupled to a user telephone, the system comprising:
   a telephone service facility interface for receiving an incoming call signal from the external telephone service facility;
   a user telephone interface for transmitting the incoming call signal to the user telephone and for receiving an administrative signal from the user telephone;
   a memory;
   a messaging module for storing in the memory a calling party message received from a calling party in the incoming call signal; and
   a connection module responsive to the administrative signal received from the user telephone via the user telephone interface for receiving an incoming call signal and processing the incoming call signal to either connect the incoming call signal to the messaging module or to transmit the incoming call signal to the user telephone via the user telephone interface.

2. The system of claim 1 wherein the incoming call signal comprises a calling party number and the memory stores one or more authorized calling party numbers, and wherein the connection module is configured to connect the incoming call signal to the user telephone interface when the calling party number in the incoming call signal matches one of the authorized calling party numbers stored in the memory.

3. The system of claim 1 wherein the incoming call signal comprises a calling party passcode for authenticating the calling party and the memory stores one or more authorized caller passcodes, and wherein the connection module is configured to connect the incoming call signal to the user telephone interface when the calling party passcode matches one of the authorized caller passcodes stored in the memory.

4. The system of claim 1 wherein the incoming call signal comprises a calling party number and an authorized caller passcode, and the memory stores one or more authorized caller numbers and stores one or more authorized caller passcodes for authenticating the calling party, wherein said connection module stores in the memory the calling party number in the incoming call signal when the calling party passcode in the incoming call signal matches one of the authorized caller passcodes stored in the memory.

5. The system of claim 1 wherein the incoming call signal comprises a calling party passcode for authenticating the calling party and the memory stores one or more direct message routing passcodes, and wherein the connection module is configured to connect the incoming call signal to the messaging module when the calling party passcode matches one of the direct message routing passcodes stored in the memory without transmitting a ringing signal to the user telephone interface.

6. The system of claim 1 wherein the incoming call signal comprises a calling party message and wherein said connection module connects the incoming call signal to the messaging module for receiving the calling party message and causes a message ringing signal to be transmitted to the user telephone interface.

7. The system of claim 6 wherein said connection module is configured to transmit a copy of the calling party message to the user telephone interface when the user telephone interface is placed in an off-hook mode during the receiving of the calling party message without being detectable at the telephone service facility interface.

8. The system of claim 7 wherein said connection module is configured to connect the calling party signal to the user telephone interface and to disconnect the incoming call signal from the messaging module when an administrative signal from the user telephone is received.

9. The system of claim 1 wherein said connection module is configured to connect the incoming call signal to the messaging module and to transmit a text message to the user telephone interface, said text message being something other than a calling party number of the incoming call signal.

10. The system of claim 1 wherein the administrative signal is initiated from the user telephone being in an off-hook mode and wherein said connection module is configured to receive the administrative signal and configured to signal the telephone service facility interface that the user telephone is in an on-hook mode, wherein the connection module is configured to receive an incoming call signal from the telephone service facility interface contemporaneous with the user telephone in the off-hook mode receiving the administrative signal from the user.

11. The system of claim 1 wherein the calling party signal is a data signal generated from a remote computer, the data signal containing a remote administrative instruction, further comprising a processor configured to receive the data signal and the remote administrative instruction, the connection module and messaging module being responsive to the remote administrative instruction.

12. The system of claim 1 wherein the connection module initiates a disconnect from the telephone service facility following the connection of the incoming call signal to either the messaging module or the user telephone when one or more of the following are detected: a momentary loop current reversal, a loop current interruption, a call progress tone, and a pre-determined period of silence.

13. The system of claim 1 wherein the telephone service facility interface receives an administrative instruction from a remote computer, the memory storing operating software and a configuration parameter, the connection module processing the received incoming call signal responsive to the stored operating software and the stored configuration parameter, and responsive to the received administrative instruction.

14. The system of claim 13 wherein the administrative instruction comprises one or more of the following: operating software, diagnostic software, telephone feature software, a feature parameter, feature data, and a diagnostic query.

15. The system of claim 13 wherein the connection module transmits the configuration parameter to the remote computer and wherein the telephone service facility interface is configured for transmitting the configuration parameter to the remote computer.

16. The system of claim 13 wherein the configuration parameter comprises one or more of the following: operating software data, a feature parameter, feature data, system status parameter, and a diagnostic parameter.

17. A method of operating a residential telephone system, the system electrically coupled to an external telephone service facility and electrically coupled to a user telephone, the method comprising:

receiving an incoming call signal, said incoming call signal comprising a calling party number and a calling party passcode;

comparing the received calling party passcode to one or more authorized caller passcodes stored in a memory; and storing in the memory the received calling party number when the received calling party passcode matches one of the authorized caller passcodes stored in the memory.

18. A method of operating a residential telephone system, the system electrically coupled to an external telephone service facility and electrically coupled to a user telephone, the method comprising:

receiving an incoming call signal, said incoming call signal comprising a calling party number, a calling party passcode, and a calling party message;

comparing the received calling party passcode to one or more direct message routing passcodes stored in a memory; and storing the received calling party message in a messaging module when the received calling party passcode matches one of the direct message passcodes stored in the memory.

19. A method of operating a residential telephone system, the system electrically coupled to an external telephone service facility and electrically coupled to a user telephone, the method comprising:

receiving an incoming call signal, said incoming call signal comprising a calling party message;

storing the received calling party message in a messaging module; and ringing the user telephone contemporaneous with storing the received incoming call message in the messaging module.

20. A method of operating a residential telephone system, the system electrically coupled to an external telephone service facility and electrically coupled to a user telephone, the method comprising:

receiving an incoming call signal, said incoming call signal comprising a calling party message;

storing the received calling party message in a messaging module; and transmitting a text message to the user telephone contemporaneous with the storing of the calling party message, said text message being something other than a calling party number of the incoming call signal.

21. A method of operating a residential telephone system, the system electrically coupled to an external telephone service facility and electrically coupled to a user telephone, the method comprising:

receiving an incoming call signal, said incoming call signal comprising a calling party message;

storing the calling party message in a messaging module;

transmitting the received calling party message to the user telephone contemporaneous with the storing of the calling party message;

receiving a user instruction during the storing of the calling party message;

terminating the storing of the received calling party message in response to the received user instruction; and connecting the received incoming call signal to the user telephone in response to the received user instruction.

22. A method of operating a residential telephone system, the system electrically coupled to an external telephone service facility and electrically coupled to a user telephone, the method comprising:

receiving an incoming call signal from the external telephone service facility;

connecting the received incoming call signal to either the user telephone or to a messaging module;

receiving an administrative instruction from the user telephone, the administrative instruction associated with an operation of the residential telephone system and not associated with the received incoming call signal, wherein said receiving of the incoming call signal and said connecting of the incoming call signal each being contemporaneous with said receiving the administrative instruction.

23. A method of operating a residential telephone system, the system electrically coupled to an external telephone service facility and electrically coupled to a user telephone, the method comprising:

receiving an incoming call signal from the external telephone service facility, the incoming call signal comprising an administrative instruction, said administrative instruction being associated with an administrative operation of the residential telephone system and not being associated with the incoming call signal;

storing the administrative instruction in a memory; and operating one or more functions of the residential telephone system responsive to the stored administrative instruction.

24. The method of claim 23 wherein the administrative instruction is one or more of the following: a diagnostic instruction, diagnostic software, operating system software, feature software, and a feature parameter.

* * * * *